(12) United States Patent
Hinault et al.

(10) Patent No.: US 8,093,319 B2
(45) Date of Patent: Jan. 10, 2012

(54) ESTERIFIED FATTY ACIDS FOR PVC PLASTICIZATION

(75) Inventors: Robert Hinault, Marcilly D'Azergues (FR); Lê Chiên Hoang, Nouaillee Maupertuis (FR); Jacques Barbier, Montamise (FR)

(73) Assignee: Gerflor, Villeurbanne (FR)

( * ) Notice: Subject to any disclaimer, the term of this patent is extended or adjusted under 35 U.S.C. 154(b) by 831 days.

(21) Appl. No.: 11/813,651

(22) PCT Filed: Jan. 3, 2006

(86) PCT No.: PCT/FR2006/000003
§ 371 (c)(1),
(2), (4) Date: Mar. 17, 2008

(87) PCT Pub. No.: WO2006/075071
PCT Pub. Date: Jul. 20, 2006

(65) Prior Publication Data
US 2008/0200595 A1   Aug. 21, 2008

(30) Foreign Application Priority Data
Jan. 17, 2005 (FR) .................................. 05 00566

(51) Int. Cl.
*C08K 5/15* (2006.01)

(52) U.S. Cl. ............... 524/114; 524/273; 524/285
(58) Field of Classification Search ................ 524/273, 524/285, 114
See application file for complete search history.

(56) References Cited

U.S. PATENT DOCUMENTS

| | | | | |
|---|---|---|---|---|
| 3,149,088 A * | 9/1964 | Dazzi | ............... | 524/285 |
| 4,031,045 A * | 6/1977 | Goswami | ............... | 521/73 |
| 4,317,760 A * | 3/1982 | Tsuda et al. | ............... | 524/111 |
| 5,739,203 A * | 4/1998 | Ngoc | ............... | 524/527 |
| 6,797,753 B2 * | 9/2004 | Benecke et al. | ............... | 524/114 |
| 2002/0013396 A1 | 1/2002 | Benecke et al. | | |
| 2009/0291304 A1 * | 11/2009 | Gosse et al. | ............... | 428/375 |

FOREIGN PATENT DOCUMENTS

| | | |
|---|---|---|
| DE | 19509085 A1 | 9/1996 |
| FR | 1145180 A | 10/1957 |
| FR | 1254722 A | 2/1961 |
| FR | 1331153 A | 6/1963 |
| FR | 2354358 A | 1/1978 |
| GB | 1522776 | 4/1977 |

* cited by examiner

*Primary Examiner* — Peter D Mulcahy
(74) *Attorney, Agent, or Firm* — Heslin Rothenberg Farley & Mesiti P.C.

(57) ABSTRACT

At least one esterified fatty acid, particularly a fatty acid from tall oil that undergoes a Diels-Alder reaction or a fatty acid from oleic sunflower oil that undergoes an epoxydation reaction, is used as a PVC plasticizer, particularly for floor coverings.

17 Claims, No Drawings

ESTERIFIED FATTY ACIDS FOR PVC PLASTICIZATION

CROSS REFERENCE TO RELATED APPLICATIONS

This is a Section 371 filing of International Application No. PCT/FR2006/000003 filed Jan. 3, 2006, and published, in French, as International Publication No. WO 2006/075071 A1 on Jul. 20, 2006, and claims priority of French Application No. 05.00566 filed on Jan. 17, 2005, all of which applications are hereby incorporated by reference herein, in their entirety.

TECHNICAL FIELD

This invention deals with derivatives of renewable resources whose plasticization properties on polyvinyl chloride (PVC) have been observed.

More precisely, it concerns esterified fatty acids from tall oil and which have undergone a Diels-Alder reaction, or from oleic sunflower oil which has undergone an epoxidation reaction.

Consequently, these molecules are used for PVC plasticization, and notably in the production of floor coverings.

PRIOR ART

Polyvinyl chloride, or PVC, is a widely-used polymer which has many applications in rigid form (profiles, plates, hollow parts, etc.), but also in plasticized form, notably in the field of sheets, films, coated fabrics, floor coverings and putties.

The main role and interest of plasticizers is to decrease hardness (quantified in Shore A or D), Young's modulus of the polymer and its glass transition temperature (Tg). Moreover, a suitable plasticizer increases elongation at break and impact strength at low temperature.

The layers of plasticized PVC are mainly made using coating or calendering techniques for floor coverings, but other technologies are possible, such as extrusion or pressing.

In coating, the PVC is dispersed in the liquid plasticizer, then this dispersion, called plastisol, is coated on a support and gelled in an oven (hot air or IR) at temperatures between 160 and 190° C. for 3 to 4 minutes. The viscosity of the plastisol can be adjusted for the support to be coated. To obtain expanded layers, a foaming agent is added to the plastisol, releasing a gas during the gelling phase.

In the calendering technique, the different ingredients of the formulation are mixed in the form of a "dry blend" (powered mixture), because the plasticizer is absorbed by the porous PVC beads. This mixture is then gelled in an internal mixer or a twin-screw extruder. The gelled material is then shaped by calendering into the form of sheets with controlled width and thickness.

To date, the list of PVC known plasticizers is long. The most commonly used today are esters from petrochemicals, for example adipates, sebacates, phosphates, citrates or butyrates, and more particularly phthalates, such as diethylhexylphthalate (DEHP or DOP).

From an environmental point of view, it is obviously desirable to find alternatives to these solutions, which are considered to be pollutants. Moreover, the toxicity of phthalates on human health has been demonstrated and their use risks becoming increasingly limited.

Thus, it has been envisaged that "modified" vegetable oils could be used, notably when epoxidised, as PVC plasticizers. For example, epoxidised soybean oil can be found on the market. And yet, in practice, most of these oils can only be used in combination with a traditional plasticizer, insofar as they only be integrated into the polymer in very small amounts (<10 percent of resin). They are thus considered as secondary plasticizers. They are, in fact, mainly used for their stabilising action on PVC due to their epoxy functions.

As an example, document FR-A-2 623 514 describes stabilised compositions which can be used in the production of PVC-based sheets, incorporating 3 to 10 parts of epoxidised unsaturated fatty acid esters, but also 10 to 70 parts of at least one organic plasticizer such as DOP.

It has been demonstrated, however, that certain plants are better suited sources for obtaining fatty acids for PVC plasticization and that certain chemical reactions performed on these fatty acids, notably epoxidation, can improve their properties.

Thus, document US 2002/013396 describes compositions for plasticizing PVC where fatty acids contain substantially unsaturated fatty acids (iodine value >100), from vegetable oils, esterified with alcohol and substantially epoxidised. Sunflower oil and tall oil are more particularly mentioned as suitable sources.

There is an obvious need to identify new usable substances for plasticizing PVC with qualities superior to the solutions described in the prior art, notably better compatibility with PVC to avoid problems of exudation over time, making the use of the objects produced difficult (floor coatings, for example).

DISCLOSURE OF THE INVENTION

In the context of the invention, the Applicant has demonstrated that it is possible to obtain derivatives from highly specific renewable natural resources, particularly suited to the function of PVC plasticizer.

More precisely, it is a question of the fatty acids contained in renewable resources and modified by esterification.

Thus, the invention concerns the use of esterified fatty acids, identified as being particularly interesting in the context of this invention, as PVC plasticizers.

A plasticizer is considered to be particularly interesting when it provides physical and mechanical properties (gel time, melting temperature, hardness, elongation at break, etc.) at least comparable to those of a reference plasticizer, here DEHP, as well as acceptable aesthetic qualities (appearance and feel).

By definition, fatty acids comprise a linear hydrocarbon chain with an even number of carbon atoms, terminating with a carboxyl group, whether hydrogen-saturated or not.

In the context of the invention, these fatty acids come from renewable natural sources. They are preferably in the form of an esterified fatty acid mixture.

While it is not possible to determine the exact composition of such mixtures, the analysis of certain parameters, defined and measured according to well-established standards, can be used to further define the mixtures obtained:

acid value: (NFT 60-204)
    saponification value: (NF ISO 3657)
    hydroxyl value: (AOCS-TX1a-66)
    iodine value: (NF ISO 3961)
    peroxide value: (NFT 60-220)
    oxirane value: (AOCS-Cd9-57)
    kinematic viscosity: (ISO 3104)

In the context of the invention, the Applicant has identified two privileged renewable sources:

tall oil, a liquid resin obtained as a by-product from the production of chemical pulp from pine wood;

oleic sunflower oil produced by a variety of sunflower that is rich in oleic acid.

The fatty acids commonly found in these sources include:
palmitic acid ($C_{16}H_{32}O_2$);
palmitoleic acid ($C_{16}H_{30}O_2$);
stearic acid ($C_{18}H_{36}O_2$);
oleic acid ($C_{18}H_{34}O_2$);
linoleic acid ($C_{18}H_{32}O_2$);
linolenic acid ($C_{18}H_{30}O_2$);
arachidic acid ($C_{20}H_{40}O_2$);
eicosenic acid ($C_{20}H_{38}O_2$);
bebenic acid ($C_{22}H_{44}O_2$);
erucic acid ($C_{22}H_{42}O_2$).

According to the invention, the fatty acids used as PVC plasticizers therefore have chain lengths between 16 and 22 carbon atoms.

To increase the polarity and size of the natural fatty acids for their good interaction with the PVC, the Applicant subjected these fatty acids to esterification, consistent with causing the carboxylic function to react with an alcohol.

Any alcohol containing at least two C atoms should, a priori, be usable. In the context of the invention, however, ethanol is preferably used insofar as this alcohol, available in large quantities, is also of natural origin. Ethyl esters are thus obtained.

According to a first aspect of the invention, the fatty acids used are from tall oil and have undergone a Diels-Alder reaction.

The Diels Alder reaction consists in making an alkene and a conjugated diene react to form a cyclohexene derivative. This reaction may take place, for example, with a monounsaturated fatty acid of the C18:1 type and a diunsaturated fatty acid of the C18:2 type, present in tall oil.

After esterification according to the invention, the products of this reaction thus have the following formula:

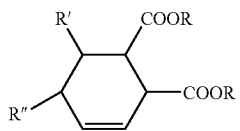

where R=alcohol radical;
R' and R"=radicals $C_{14}$ to $C_{22}$

Preferably, the mixture of esterified fatty acids is obtained after esterification of a product from tall oil which have undergone a Diels-Alder reaction, sold under the name of AG21 ("Acides Gras 21", from the DRT company). This mixture therefore comprises ethyl esters of cyclic diacids from tall oil (EEAG21).

An example of a mixture with particularly good performances according to the invention can be characterised as follows:
density at 20° C. (g/l): approximately 950
kinematic viscosity at 40° C. (mm²/s): between 5 and 20
acid value (mg of KOH/g): $\leq 11$
saponification value (mg of KOH/g): between 250 and 265
iodine value (g of I2/100 g): $\leq 70$ A second composition according to the invention providing equally remarkable results comprises esterified fatty acids isolated from oleic sunflower oil and having undergone epoxidation.

In practice, epoxidation is performed after esterification.

More particularly, the epoxidised ethyl esters of oleic sunflower oil (EETOE) give advantageous results when used to plasticize PVC.

A highly advantageous mixture according to the invention can be characterised as follows:
acid value (mg of KOH/g): $\leq 2$
saponification value (mg of KOH/g): between 175 and 185
iodine value (g of $I_2$/100 g): $\leq 10$, preferably between 1 and 3
peroxide value (MEQ of $O_2$/kg): $\leq 50$
oxirane value (%): $\geq 4.5$
hydroxy value (mg of KOH/g): $\leq 20$
kinematic viscosity (mm²/s at 40° C.): between 5 and 20

The invention also concerns any composition including a PVC resin and a plasticizer as defined in this invention.

Such a composition could come in liquid form (plastisol) or in dry blend form, when calendering or extrusion are to be used.

Such a composition also advantageously includes a heat stabiliser whose nature and methods of use are well known to those skilled in the art.

These PVC plasticizers have new properties in the context of this use. The invention thus also concerns PVC plasticized using these new plasticizers, as well as coatings, notably for floors, containing at least one layer of plasticized PVC using these plasticizers. Accessories such as profiles, baseboards, weld rods or sill nosing, required for laying floor coatings, are also concerned by the invention. These are commonly obtained by extrusion in the form of profiles.

EXAMPLE OF EMBODIMENT

The invention and the resulting advantages will become more apparent in the following examples of embodiment. These examples, however, are not in any way restrictive.

1) Protocol for Preparing EETOE

The epoxidised ethyl esters were synthesized in two steps:
ethanolysis of oleic sunflower oil;
epoxidation of ethyl esters with oxygenated water, in presence of a short-chain carboxylic acid (formic acid or acetic acid).

The mixture obtained from these two reactions is defined with the following parameters:

| | |
|---|---|
| acid value (mg of KOH/g) | $\leq 2$ |
| saponification value (mg of KOH/g) | 175-180 |
| iodine value, g of I2/100 g | 1-2 |
| peroxide value, MEQ of O2/kg | $\leq 20$ |
| oxirane value, % | >4.5 |
| hydroxyl value, mg of KOH/g | $\leq 20$ |
| volatile matter | <0.25% |
| kinematic viscosity at 40° C., mm²/s | 9.6 |

2) Protocol for Preparing EEAG21

AG 21 is a mixture of fatty acid from tall oil with the following characteristics:
acid value, mg of KOH/g: 262
fatty acids with 18 C atoms: 20 to 60%
diacids with 21 C atoms: 36 to 70%

AG21 ethyl esters were obtained by esterification with ethanol, in presence of an acid catalyst and the boiling temperature of ethanol (reflux). After esterification, the esters were washed and dried.

The mixture thus obtained is defined by the following parameters:

| | |
|---|---|
| volatile matter | <0.3% |
| density at 20° C., g/l | 950 |
| kinematic viscosity at 40° C., mm$^2$/s | 18.7 |
| acid value, mg of KOH/g | 0.8 |
| saponification value, mg of KOH/g | 264.4 |
| iodine value, g of I$_2$/100 g | 65.8 |

3) Properties of EETOE and EEAG21 Plasticizers

The gelling power, mechanical properties and compatibility with PVC of EETOE and EEAG21 were compared with those of 4 known plasticizers (diisononyl phthalate or DINP; 2 ethylhexanol sebacate; ethylhexanol maleate, diisononyl cyclohexane or DINCH), as well as those of oleic sunflower oil that is simply epoxidised.

The formula tested comprises 100 parts of a K Wert 70 PVC resin, 35 parts of the plasticizer being evaluated and 1 part of a tin-based stabiliser. The experiments were carried out on a Brabender Plasti-corder PL2100 device.

The results are presented in table 1 below:

| Plasticizer | Iodine value g of I2/100 g | Melting time min | Max torque Nm | Energy/ Max kNm | Melting T° ° C. | Mod 5% Mpa | Mod 10% Mpa | Hardness Shore D | CR N/mm$^2$ | Elong. at Break % | FILM APPEARANCE | Feel |
|---|---|---|---|---|---|---|---|---|---|---|---|---|
| DINP | | 02:30 | 56.3 | 18.2 | 133 | 263 | 194 | 39 | 19.5 | 177 | T | F |
| Epoxidised oleic sunflower oil | 1 | 03:30 | 45 | 24.2 | 124 | 333 | 227 | 40 | 15.6 | 102 | NT | E |
| Ethyl esters of epoxidised oleic sunflower oil | 1.4 | 01:10 | 51.1 | 15.1 | 126 | 102 | 94 | 26 | 16.4 | 212 | T | NF |
| 2-ethylhexanol sebacate | | 3.38 | 40.5 | 31.9 | 120 | 212 | 158 | 31 | 14.6 | 149 | T | F |
| 2-ethylhexanol maleate | | 1.42 | 47.5 | 16.6 | 127 | 166 | 135 | 32 | 18.6 | 210 | T | F |
| DINCH | | 3.36 | 43.1 | 23.6 | 124 | 281 | 203 | 39 | 16.6 | 133 | T | F |
| Ethyl esters of Tall Oil cyclic diacid | | 2.22 | 44.4 | 25.6 | 130 | | | | | | T | NF |
| Natural Surface TLCF | | | | | | 325 | 250 | 40 | 27 | 217 | | |
| BG 65 slab | | | | | | 400 | 290 | 33 | 27 | 203 | | |

T means transparent, NT non-transparent, E exudation, F fatty NF non-fatty.

Melting time, max torque, melting energy and melting T° are obtained using a Brabender viscometer (internal standard).

The mechanical properties (modulus at 5 and 10% of elongation, load at break and elongation at break) are evaluated according to the ISO 527 standard.

Shore hardness is evaluated according to the ISO 868 standard.

4) Use of EETOE and EEAG21 Plasticizers in Coating:
4-1. Compact Coating with a Low-viscosity Formulation (table 2 below):

| Composition | 1 | 2 | 3 |
|---|---|---|---|
| Solvin 372 NF (PVC resin) | 100 | 100 | 100 |
| DEHP | 40 | — | — |
| EETOE | — | 40 | — |
| EEAG21 | — | — | 40 |
| Mark TK262GV (heat stabiliser) | 1 | 1 | 1 |

| ROTO RV20 viscosity: Pa · s | Velocity gradient s − 1 | 1 h DEHP | 7 d DEHP | 1 h EETOE | 7 d EETOE | 1 h EEAG21 | 7 d EEAG21 |
|---|---|---|---|---|---|---|---|
| | 1 | 18.7 | 32.9 | 4.3 | 13.8 | 5.8 | 15.9 |
| | 1.4 | 17.6 | 28.5 | 3.9 | 11.8 | 5.3 | 14.5 |
| | 2 | 15.8 | 26.8 | 3.5 | 9.7 | 5.2 | 12.8 |
| | 4 | 14.9 | 23.7 | 3 | 7.6 | 4.8 | 11 |
| | 8 | 14.3 | 22.7 | 2.6 | 6.3 | 4.7 | 9.6 |
| | 12 | 14.5 | 22.8 | 2.5 | 5.7 | 4.8 | 9 |
| | 16 | 14.8 | 22.8 | 2.4 | 5.3 | 5 | 8.9 |
| | 24 | 16 | 24.4 | 2.3 | 4.9 | 5.2 | 8.8 |
| | 32 | 16.9 | 25.4 | 2.2 | 4.6 | 5.5 | 8.9 |
| | 36 | 17.2 | 26.2 | 2.2 | 4.5 | 5.6 | 8.7 |
| | 64 | | | 2.2 | 4.2 | 6.8 | 10.2 |
| | 100 | | | 2.2 | 4.2 | 8 | 11 |
| | 200 | | | 2.4. | 4.5 | | |
| | 400 | | | 2.6 | | | |
| Gelling 1.30 mn at 200° C. | | | | | | | |
| Yellow index (delta) | | | 4.7 | | 6.9 | | 5.8 |
| Luminance % | | | 66.9 | | 72.4 | | 73.6 |
| Transparency % | | | 85.3 | | 90.2 | | 91.4 |
| Elongation at Break % | | | 190 | | 347 | | 320 |
| MPa constraint | | | 18 | | 24 | | 24 |

Table 3 (above) shows that we obtain:
less viscosity at 1 hour, and at 7 days;
slightly better luminance and transparency;
a slightly greater yellow index;
improved resistance qualities.

4-2. Compact Layer (table 4 below), Coating with a 0.5-mm Thick Film (at 200° C.).

| Composition | 1 | 2 | 3 |
|---|---|---|---|
| Solvin 373 MH (PVC resin) | 100 | 100 | 100 |
| DEHP | 66 | — | — |
| EETOE | — | 66 | — |
| EEAG21 | — | — | 66 |
| Irgastab BZ 505 (heat stabiliser) | 2 | 2 | 2 |

| | Time in sec | DEHP | EETOE | EEAG21 |
|---|---|---|---|---|
| LUMINANCE | 45 | 20.5 | 19.6 | 20.3 |
| | 90 | 71.5 | 85.6 | 78.9 |
| | 120 | 91.7 | 84.8 | 89.9 |
| TRANSPARENCY | 45 | 87.5 | 86.5 | 84.1 |
| | 90 | 91 | 90.8 | 90.2 |
| | 120 | 92.7 | 90.4 | 90.2 |
| YELLOW INDEX | 45 | 1.8 | 4 | 4.3 |
| | 90 | 3 | 7.3 | 5.5 |
| | 120 | 4.2 | 8.9 | 8 |
| MPA CONSTRAINT | 45 | 15.8 | 14.2 | 16.4 |
| | 120 | 16.6 | 17.7 | 20.9 |
| ELONGATION AT BREAK % | 45 | 317 | 399 | 347 |
| | 120 | 300 | 426 | 407 |
| SHORE A HARDNESS | 270 | 67.5 | 60.5 | 70.3 |

The properties of the films obtained, given in table 5 below, are comparable to those in table 3.

4-3. Foam Formula (table 6 below).

| Formula | 1 | 2 | 3 |
|---|---|---|---|
| S367 NK (PVC) | 100 | 100 | 100 |
| DEHP | 70 | — | — |
| EETEOE | — | 70 | — |
| EEAG21 | — | — | 70 |
| Kronos 2220 (titanium oxide) | 3 | 3 | 3 |
| Durcal 15 (CaCO$_2$) | 25 | 25 | 25 |
| MB (foaming agent) MB | 6 | 6 | 6 |
| Genitron ACSP4 | 3 | 3 | 3 |
| Baerostab KK42 (decomposition accelerator) | 2 | 2 | 2 |
| DEHP (coating) | 1 | 1 | 1 |

| Rheology RV 20 | Velocity gradient in sec$^{-1}$ | DEHP | EETOE | EEAG21 |
|---|---|---|---|---|
| | 1 | 13.6 | 2.6 | 10.7 |
| | 1.4 | 11.8 | 2.2 | 8.4 |
| | 2 | 10.1 | 1.9 | 6.7 |
| | 4 | 7.7 | 1.5 | 4.7 |
| | 8 | 6.4 | 1.2 | 3.6 |
| | 12 | 5.8 | 1.1 | 3.1 |
| | 16 | 5.3 | 1.1 | 2.9 |
| | 24 | 5 | 1 | 2.6 |
| | 32 | 4.7 | 0.9 | 2.4 |
| | 36 | 4.7 | 0.9 | 2.3 |
| | 64 | 4.4 | 0.8 | 2.2 |
| | 100 | 4.3 | 0.8 | 2.1 |
| | 200 | 3.9 | 0.7 | 1.9 |
| | 400 | 2.9 | 0.7 | 1.8 |
| Severs | 500 | 3.7 | | |
| | 600 | 3.5 | | |
| | 1000 | 3.2 | | |
| | 2000 | 2.8 | | 1.4 |
| | 3000 | 2.7 | 0.7 | 1.4 |
| | 4000 | 2.5 | 0.7 | 1.3 |
| Plastisol density (g/cm$^3$) | | 1.29 | 1.26 | 1.28 |
| Coating, 1 mm/200° C. 90 sec | | | | |
| Weight (g) | | 1.14 | 1.08 | 1.13 |
| Final thickness (mm) | | 3.73 | 3.32 | 4.13 |
| Density (g/cm3) | | 0.31 | 0.33 | 0.27 |
| Yellow index (D65) | | 15.9 | 28.1 | 22.1 |
| Cell quality | | 1 | 1 | 3 |
| Surface appearance | | 1 | 1 | 2 |
| 120 sec (200° C.) | | | | |
| Weight (g) | | 1.12 | 1.06 | 1.11 |
| Thickness (mm) | | 4.5 | 4.33 | 4.63 |
| Density (g/cm3) | | 0.25 | 0.24 | 0.24 |
| Yellow index (D65) | | 11.5 | 23.8 | 21.1 |
| Cell quality | | 1 | 2 | 3 |
| Surface appearance | | 1 | 1 | 3 |

Table 7 (above) shows the equivalent qualities obtained with foam formulas.

All of these results show that, with EETOE or EEAG21 as a plasticizer, it is possible to produce compact or cell coated layers with a rheological advantage and a (minor) disadvantage in the yellow index, compared with DEHP.

5) Us of a PVC Suspension in Calendering:

Two resins were tested: Solvin 264 GB (KW 64) and Solvin 271 PC (KW 71).

Absorption of the plasticizers measured at T=75° C. is presented in table 8 (below):

| | | 264 GB | | 271 PC | |
|---|---|---|---|---|---|
| Results in % | | TIME | % | TIME | % |
| DEHP | | 0 | 23.8 | 0 | 33.3 |
| | | 5 | 28 | 5 | 36.7 |
| | | 10 | 51.7 | 10 | 53.1 |
| | | 15 | 75.1 | 15 | 75.1 |
| | | 30 | 128.1 | 30 | 106.9 |
| | | 60 | 137.1 | 60 | 113.1 |
| EETOE | | 0 | 21.2 | 0 | 29.8 |
| | | 5 | 101.3 | 5 | 91.7 |
| | | 10 | 105 | 10 | 92.7 |
| | | 15 | 106.3 | 15 | 93.7 |
| | | 30 | 107.7 | 30 | 94.9 |
| | | 60 | 108.4 | 60 | 95.3 |
| EEAG21 | | 0 | 22.33 | 0 | 31.2 |
| | | 5 | 24.4 | 5 | 32.9 |
| | | 10 | 33.6 | 10 | 40.4 |
| | | 15 | 52.3 | 15 | 53.9 |
| | | 30 | 78 | 30 | 77.1 |
| | | 60 | 81 | 60 | 79.4 |

The measurements show that the absorption of the EETEO and EEAG21 plasticizers, for two resins with differing molecular weights, can be compared with that of DEHP as follows:

for EETOE, the absorption speed is higher than for DEHP;
for EEAG21, the opposite results was obtained.

In all cases, these absorption speeds are compatible with the dry blend production method.

Furthermore, heat stability was assessed using a Collin mixer at 160° C. The results are presented in table 9 below:

| Samples | 1 | 2 | 3 | 4 | 5 | 6 | 7 |
|---|---|---|---|---|---|---|---|
| Solvin 271PC (PVC) | 100 | 100 | 100 | 100 | 100 | 100 | 100 |
| EETOE | — | 25 | 40 | 55 | — | — | — |
| EEAG21 | — | — | — | — | 25 | 40 | 55 |
| DEHP | 45 | — | — | — | — | — | — |
| Master batch | 5 | 5 | 5 | 5 | 5 | 5 | 5 |
| YI measurement | 4.8 | 9.8 | 6.6 | 5.7 | 9.8 | 8.4 | 8.2 |
| Heat stability min/sec | 17'15" | >30' | >30' | >30' | 16'45 | 16'45 | 17'45 |
| Shore A hardness | 87 | >90 | 83 | 74 | >90 | >90 | 81 |
| Shore D hardness | 33 | 48 | 28 | <20 | 57 | 37 | 25 |

Once again, we can observe that heat stability is at least equal, with potentially reduced hardness.

The invention claimed is:

1. A method of making plasticized PVC, said method comprising bringing into contact PVC and an esterified fatty acid PVC plasticizer, wherein the PVC plasticizer consists of:
   (a) a mixture of esterified tall oil fatty acids, said mixture comprising esterified fatty acids isolated from tall oil that have undergone a Diels-Alder reaction and have the following general formula:

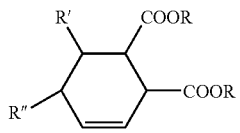

where R=alcohol radical; and
   R' and R"=radicals $C_{14}$ to $C_{22}$;
   and/or
   (b) a mixture of esterified oleic sunflower oil fatty acids, wherein said mixture is obtained by esterifying and epoxidizing fatty acids isolated from oleic sunflower oil.

2. A method according to claim 1, wherein the fatty acids have a carbon chain with 16 to 22 carbon atoms.

3. A method according to claim 1, wherein the esterified fatty acids comprise ethyl esters.

4. A method according to claim 1, wherein the PVC plasticizer consists of a mixture of esterified tall oil fatty acids, said mixture comprising ethyl esters of cyclic diacids from tall oil (EEAG21).

5. A method according to claim 4, wherein the mixture has the following characteristics:
   density at 20° C. (g/l): approximately 950
   kinematic viscosity at 40° C. (mm²/s): between 5 and 20
   acid value (mg of KOH/g): ≦11
   saponification value (mg of KOH/g): between 250 and 265
   iodine value (g of I2/100 g): ≦70.

6. A method according to claim 1, wherein the PVC plasticizer consists of a mixture of esterified oleic sunflower oil fatty acids, said mixture comprising epoxidised ethyl esters of oleic sunflower oil (EETOE).

7. A method according to claim 6, wherein the EETOE mixture has the following characteristics:
   acid value (mg of KOH/g): ≦2
   saponification value (mg of KOH/g): between 175 and 185
   iodine value (g of $I_2$/100 g): ≦10
   peroxide value (MEQ of $O_2$/kg): ≦50
   oxirane value (%): ≧4.5
   hydroxy value (mg of KOH/g): ≦20
   kinematic viscosity (mm²/s at 40° C.): between 5 and 20.

8. A method of making plasticized PVC according to claim 1, further comprising adding a heat stabilizer.

9. A composition containing a PVC resin and a plasticizer, wherein the PVC plasticizer consists of:
   (a) a mixture of tall oil fatty acid esters, said mixture comprising tall oil fatty acid esters that have the following general formula:

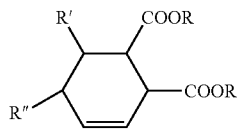

where R=alcohol radical; and
   R' and R"=radicals $C_{14}$ to $C_{22}$;
   and/or
   (b) a mixture of oleic sunflower oil fatty acid esters.

10. A coating containing a composition as defined in claim 9.

11. A coating according to claim 10 wherein the coating is a floor covering.

12. A composition according to claim 9, wherein said plasticizer comprises a mixture of tall oil fatty acid esters and has the following characteristics:
   density at 20° C. (g/l): approximately 950
   kinematic viscosity at 40° C. (mm²/s): between 5 and 20
   acid value (mg of KOH/g): ≦11
   saponification value (mg of KOH/g): between 250 and 265
   iodine value (g of I2/100 g): ≦70.

13. A coating containing a composition as defined in claim 12.

14. A coating according to claim 13 wherein the coating is a floor covering.

15. A composition according to claim 9, wherein said plasticizer comprises a mixture of oleic sunflower oil fatty acid esters and has the following characteristics:
   acid value (mg of KOH/g): ≦2
   saponification value (mg of KOH/g): between 175 and 185
   iodine value (g of $I_2$/100 g): ≦10
   peroxide value (MEQ of $O_2$/kg): ≦50
   oxirane value (%): ≧4.5
   hydroxy value (mg of KOH/g): ≦20
   kinematic viscosity (mm²/s at 40° C.): between 5 and 20.

16. A coating containing a composition as defined in claim 15.

17. A coating according to claim 16 wherein the coating is a floor covering.

* * * * *